United States Patent [19]

Yamamoto et al.

[11] Patent Number: 4,837,416
[45] Date of Patent: Jun. 6, 1989

[54] CUT WIRE FOR ELECTRICAL DISCHARGE MACHINING

[75] Inventors: Susumu Yamamoto; Yoshimitsu Aoki, both of Itami, Japan

[73] Assignee: Sumitomo Electric Industries, Ltd., Osaka, Japan

[21] Appl. No.: 943,943

[22] Filed: Dec. 9, 1986

[30] Foreign Application Priority Data

Dec. 20, 1985 [JP] Japan ................... 60-288197

[51] Int. Cl.⁴ .............................................. B23H 7/08
[52] U.S. Cl. ................................................. 219/69.12
[58] Field of Search ...................... 219/69 W, 69 E; 148/12 B, 12 E; 428/676, 677, 607

[56] References Cited

U.S. PATENT DOCUMENTS

| | | | |
|---|---|---|---|
| 4,287,404 | 9/1981 | Convers et al. | 219/69 M |
| 4,360,390 | 11/1982 | Tominaga et al. | 148/12 B |
| 4,495,038 | 1/1985 | Inoue | 219/69 M |
| 4,609,803 | 9/1986 | Inoue | 219/69 M |
| 4,686,153 | 8/1987 | Tominaga et al. | 219/69 W |

FOREIGN PATENT DOCUMENTS

| | | | |
|---|---|---|---|
| 185492 | 6/1986 | European Pat. Off. | 219/69 W |
| 120429 | 7/1983 | Japan | 219/69 W |
| 169723 | 9/1984 | Japan | 219/69 W |
| 2059324 | 4/1981 | United Kingdom | 219/69 W |

OTHER PUBLICATIONS

"Wire for Wirecut EDM" by Bohemia in pp. 22-25 of Mar./Apr. 1984 issue of EDM Digest.
"Choice of EDM Tooling" by Carter et al. in pp. 27-33 and 44 of Jan./Feb. 1981 issue of EDM Digest.

*Primary Examiner*—A. D. Pellinen
*Assistant Examiner*—Geoffrey S. Evans
*Attorney, Agent, or Firm*—Wenderoth, Lind & Ponack

[57] ABSTRACT

An improved cut wire used as an electrode in electrical discharge machining which wire has higher tensile strength at high temperatures. It is a composite wire having a core of stainless steel and a covering layer of copper or copper alloy provided around the core. The diameter and the tensile strength of the cut wire and the percentage of the sectional area of the core to that of the entire cut wire are important parameters in the composite wire.

2 Claims, 1 Drawing Sheet

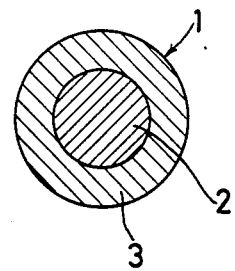

CUT WIRE FOR ELECTRICAL DISCHARGE MACHINING

BACKGROUND OF THE INVENTION

The present invention relates to a cut wire used as an electrode in electrical discharge machining which is superior in high-temperature strength.

A fine brass wire of 65% Cu - 35% Zn in material and 0.1-0.3 mm in diameter has hitherto been used as a cut wire for electrical discharge machining. Since a brass wire is low in tensile strength at normal and high temperatures, it is difficult to expect a high degree of accuracy in machining using a finer wire. By using the finer wire with higher tension applied, the higher accuracy in electrical discharge machining is attainable. But, in the case of brass wire, the possibility of the wire breaking increases because of its low high-temperature strength, and it cannot meet the above requirement.

Also, because of its low high-temperature strength, wear progresses rapidly and the wire feed speed must be increased accordingly. Further, it is difficult to use a finer wire and to apply a higher tension to the wire, and thus the machining speed is low.

SUMMARY OF THE INVENTION

An object of the present invention is to provide a cut wire which can improve the accuracy in electrical discharge machining and increase the machining speed.

In order to solve the above problems, the present invention provides a cut wire 1 which is a composite wire having a covering layer 3 of copper or its alloy around a core material 2 of stainless steel as the cut wire 1 as shown in the attached drawing. The diameter of the cut wire should be 0.05-0.4 mm and the ratio of the sectional area of the core material 2 to the sectional area of the cut wire, that is, SI/SI+SII, wherein SI designates the sectional area of the core material 2, while SII does that of the covering layer 3, should be 0.3-0.9 (30-90%), and the tensile strength of the cut wire should be 40-200 Kg/mm$^2$.

The tensile strength may be either the strength after annealing (solution treatment) or the strength after wire drawing.

High tensile strength at normal and high temperatures is assured owing to the characteristics of the core material 2, and the electrical conductivity necessary for electrical discharge machining is assured by the covering layer 3.

Other objects and advantages of the present invention will become apparent from the following description taken with reference to the accompanying single drawing, which is a sectional view of the cut wire according to the present invention.

BRIEF DESCRIPTION OF THE DRAWING

The FIGURE shows a sectional view of the electrode wire according to the present invention.

DESCRIPTION OF THE PREFERRED EMBODIMENT(S)

In this invention, the diameter of the cut wire 1 is limited to the abovesaid values. This is because, if the diameter is smaller than 0.05 mm, there is the possibility of breaking of wire under harsh conditions owing to insufficient strength at normal and high temperatures in spite of the existence of the core material for reinforcement. If the diameter of the wire is more than 0.4 mm, it becomes difficult to expect high accuracy in electrical discharge machining. The ratio of the sectional area of the core material 2 to the whole sectional area is limited to 30-90%. If it is less than 30%, the rate of increase in strength at normal and high temperatures is too small to exhibit sufficient effect of the present invention. If it is over 90%, the percentage conductivity will be less than 10%. The specific properties as a cut wire for electrical discharge machining will not be sufficient.

Furthermore, if the tensile strength is less than 40 Kg/mm$^2$, the cut wire cannot exhibit its advantage as high-strength material. If it is over 200 Kg/mm$^2$, curling tendency necessary for use as a cut wire will not be obtained.

In order to confirm the effect of the invention, the specimens of the cut wire shown in Table I were prepared.

The specimens No.1-No. 8 in this table are the cut wires of the present invention. Among them, No. 1-4, 6, and 7 were prepared to the final wire diameters by cladding a copper pipe of 5.0 mm in outer diameter and 0.8 mm in thickness on the core material so that the ratio of the sectional area of the core material to that of the entire cut wire will be the values as shown in the table, and repeating wire drawing and annealing. Also, the specimens No. 5 and No. 8 were prepared to the final diameter by plating a stainless wire of 1.25 mm and 0.5 mm, respectively, in diameter and repeating wire drawing and annealing.

The SUS 304 stainless steel described in Table I is a stainless steel composition specified by the Japanese Industrial Standard (JIS) to have the following composition:

| | | |
|---|---|---|
| C | ≦ | 0.08 wt % |
| Si | ≦ | 1.00 |
| Mn | ≦ | 2.00 |
| P | ≦ | 0.045 |
| S | ≦ | 0.030 |
| Ni | | 8.00-10.50 |
| Cr | | 18.00-20.00 |

The conductivity and tensile strength at normal and high temperatures for each cut wire shown in Table 1 were evaluated. The results are shown in Table 2.

As seen from Table 2, although the conductivity of No. 8 cut wire was lower than that of the conventional wires, those of the other wires were higher compared with the conventional wires. The tensile strength of all the specimens increased substantially not only at normal temperature but at high temperature, compared with the conventional wires.

Further, the specimens were tested for machining speed when used for actual electrical discharge machining. The aim of this test was to evaluate their machining capability when machining SKD-11 steel 5 mm thick, feeding the cut wire at a speed of 30 m/sec. and applying a current of 6A. The maximum machining speed is the maximum value within the limit where the wire can be used stably without wire breaking down. The results are shown in Table 3.

As seen from the Table, the machining speed when employing the wires according to the present invention is faster by 20% or more than the conventional wires if the diameters of the wires are equal. Even if the diameter of the wire is smaller than those of the conventional ones, the machining speed is sometimes as fast as or even faster than the conventional wires.

As described above, this invention increases the tensile strength of the cut wire considerably at normal and high temperatures with the help of the core material of stainless steel. The surrounding cover layer 3 ensures high conductivity. Thanks to the above characteristics of the wire, when the cut wire is used for electrical discharge machining, the machining speed increases and the possibility of wire breakdown decreases. If the machining speed is identical, it is possible to improve the machining accuracy by using a finer wire.

Further, by selecting properly the material and the ratio of the sectional areas of the core material to the covering layer, it is sometimes possible to speed up the machining even if the wire diameter is smaller.

TABLE 1

| Specimen No. | Wire dia. (mm) | Sectional structure $\left(\frac{SI}{SI + SII}\right)$ | Covering method | Final process |
| --- | --- | --- | --- | --- |
| Cut wires of present invention | | | | |
| 1 | 0.2 | Pure copper on SuS 304 (35%) | Copper pipe cladding | Wire drawing |
| 2 | 0.2 | Pure copper on SuS 304 (50%) | Copper pipe cladding | Wire drawing |
| 3 | 0.2 | Pure copper on SuS 304 (75%) | Copper pipe cladding | Wire drawing |
| 4 | 0.2 | Pure copper on SuS 304 (50%) | Copper pipe cladding | Annealing |
| 5 | 0.2 | Pure copper on SuS 304 (75%) | Copper plating | Wire drawing |
| 6 | 0.1 | Pure copper on SuS 304 (50%) | Copper pipe cladding | Wire drawing |
| 7 | 0.3 | Pure copper on SuS 304 (50%) | Copper pipe cladding | Wire drawing |
| 8 | 0.3 | 7-3 brass on SuS 304 (50%) | Brass plating | Wire drawing |
| Conventional wires | | | | |
| 9 | 0.2 | 35% Zn—64% Cu single layer | — | Annealing |
| 10 | 0.2 | 35% Zn—64% Cu single layer | — | Wire drawing |
| 11 | 0.25 | 35% Zn—64% Cu single layer | — | Wire drawing |

TABLE 2

| | | | Strength (kg/mm$^2$) | |
| --- | --- | --- | --- | --- |
| Specimen No. | | Conductivity (%) | Normal temp. | 200° C. | 400° C. |
| Cut | 1 | 73 | 89 | 82 | 64 |
| wires of | 2 | 49 | 131 | 120 | 91 |
| present | 3 | 34 | 182 | 171 | 138 |
| invention | 4 | 48 | 56 | 54 | 49 |
| | 5 | 33 | 179 | 169 | 132 |
| | 6 | 48 | 133 | 119 | 90 |
| | 7 | 50 | 129 | 118 | 91 |
| | 8 | 15 | 139 | 123 | 92 |
| Conven- | 9 | 28 | 44 | 35 | 13 |
| tional | 10 | 28 | 104 | 75 | 14 |
| wires | 11 | 27 | 99 | 73 | 15 |

*In the table, the high-temperature strength at 200° C. and 400° C. are the values after heating for 10 minutes and conducting a tensile test.

TABLE 3

| Specimen No. | | Max. machining speed (mm$^2$/min.) | Machining accuracy |
| --- | --- | --- | --- |
| Cut | 1 | 60 | o (Good) |
| wires of | 2 | 64 | o |
| present | 3 | 61 | o |
| invention | 4 | 62 | o |
| | 5 | 58 | o |
| | 6 | 49 | (Very good) |
| | 7 | 74 | o |
| | 8 | 71 | o |
| Conven- | 9 | 48 | Δ (Not very good) |
| tional | 10 | 51 | o |
| wires | 11 | 57 | Δ |

What is claimed is:

1. An electrical discharge machining wire electrode comprising a core of austanitic stainless steel and a covering layer of copper or copper alloy provided around said core, said cut wire having a diameter of 0.05 to 0.4 mm and a tensile strength of 40 to 200 kg/mm$^2$, the percentage of the sectional area of said core to that of the entire cut wire being 30 to 90 percent.

2. An electrical discharge machining wire electrode according to claim 1 in which the stainless steel core consists essentially of:

| C | $\leq$ | 0.08 wt % |
| --- | --- | --- |
| Si | $\leq$ | 1.00 |
| Mn | $\leq$ | 2.00 |
| P | $\leq$ | 0.045 |
| S | $\leq$ | 0.030 |
| Ni | | 8.00–10.50 |
| Cr | | 18.00–20.00 |

* * * * *